US006658052B2

(12) United States Patent
Krinsky et al.

(10) Patent No.: US 6,658,052 B2
(45) Date of Patent: Dec. 2, 2003

(54) SYSTEMS AND METHODS FOR ESTABLISHING A DIAGNOSTIC TRANSMISSION MODE AND COMMUNICATING OVER THE SAME

(75) Inventors: David M. Krinsky, Acton, MA (US); Robert Edmund Pizzano, Jr., Stoneham, MA (US)

(73) Assignee: Aware, Inc., Bedford, MA (US)

( * ) Notice: Subject to any disclaimer, the term of this patent is extended or adjusted under 35 U.S.C. 154(b) by 120 days.

(21) Appl. No.: 09/755,173

(22) Filed: Jan. 8, 2001

(65) Prior Publication Data

US 2001/0040918 A1 Nov. 15, 2001

Related U.S. Application Data

(60) Provisional application No. 60/224,308, filed on Aug. 10, 2000, and provisional application No. 60/174,865, filed on Jan. 7, 2000.

(51) Int. Cl.[7] .............................................. H04L 5/16
(52) U.S. Cl. ..................... 375/222; 375/224; 370/241
(58) Field of Search ................................. 375/219, 220, 375/222, 224, 227; 370/241, 248, 252

(56) References Cited

U.S. PATENT DOCUMENTS

| | | | | |
|---|---|---|---|---|
| 4,566,100 A | * | 1/1986 | Mizuno et al. ............. | 375/280 |
| 5,128,619 A | | 7/1992 | Bjork et al. | |
| 5,608,643 A | * | 3/1997 | Wichter et al. ................ | 221/9 |
| 5,864,602 A | | 1/1999 | Needle | |
| 5,964,891 A | * | 10/1999 | Caswell et al. ............... | 714/31 |

(List continued on next page.)

FOREIGN PATENT DOCUMENTS

| | | |
|---|---|---|
| EP | 0 889 615 A2 | 1/1999 |
| GB | 2 303 032 | 2/1997 |
| WO | WO 97/01900 | 1/1997 |
| WO | WO 99/26375 | 5/1999 |
| WO | WO 99 63427 A | 12/1999 |
| WO | WO 00/64130 A2 | 10/2000 |

OTHER PUBLICATIONS

PCT International Search Report dated Oct. 9, 2002 for PCT/US01/41653.

Boets P. et al.: "*Modeling Aspect of Transmission Line Networks*" Proceedings Of The Instrumentation And Measurement Technology Conference, US, New York, IEEE, May 12, 1992, pp. 137–141, XP000343913 ISBN: 0–7803–0640–6.

Lewis L. et al. "Extending Trouble Ticket System to Fault Diagnostics" IEEE Network, IEEE Inc. New York, US, Nov. 1, 1993, pp. 44–51, XP 000575228.

International Search Report for PCT/US01/00418 dated Jul. 16, 2001; 4 pages.

Primary Examiner—Stephen Chin
Assistant Examiner—Kevin Kim
(74) Attorney, Agent, or Firm—Nixon Peabody LLP; Jason H. Vick

(57) ABSTRACT

Upon detection of a trigger, such as the exceeding of an error threshold or the direction of a user, a diagnostic link system enters a diagnostic information transmission mode. This diagnostic information transmission mode allows for two modems to exchange diagnostic and/or test information that may not otherwise be exchangeable during normal communication. The diagnostic information transmission mode is initiated by transmitting an initiate diagnostic link mode message to a receiving modem accompanied by a cyclic redundancy check (CRC). The receiving modem determines, based on the CRC, if a robust communications channel is present. If a robust communications channel is present, the two modems can initiate exchange of the diagnostic and/or test information. Otherwise, the transmission power of the transmitting modem is increased and the initiate diagnostic link mode message re-transmitted to the receiving modem until the CRC is determined to be correct.

192 Claims, 2 Drawing Sheets

U.S. PATENT DOCUMENTS

| | | |
|---|---|---|
| 6,075,821 A | 6/2000 | Kao et al. |
| 6,188,717 B1 * | 2/2001 | Kaiser et al. ................ 375/148 |
| 6,219,378 B1 * | 4/2001 | Wu ............................. 375/231 |
| 6,404,774 B1 * | 6/2002 | Jenness ...................... 370/465 |
| 6,411,678 B1 * | 6/2002 | Tomlinson et al. ......... 379/1.01 |
| 6,449,307 B1 * | 9/2002 | Ishikawa et al. ............. 375/146 |
| 6,512,789 B1 * | 1/2003 | Mirfakhraei ................. 375/229 |

* cited by examiner

SYSTEMS AND METHODS FOR ESTABLISHING A DIAGNOSTIC TRANSMISSION MODE AND COMMUNICATING OVER THE SAME

This application claims the benefit of Provisional application Ser. Nos. 60/224,308, filed Aug. 10, 2000, and 60/174,865, filed Jan. 7, 2000.

FIELD OF THE INVENTION

This invention relates to test and diagnostic information. In particular, this invention relates to a robust system and method for communicating diagnostic information.

BACKGROUND OF THE INVENTION

The exchange of diagnostic and test information between transceivers in a telecommunications environment is an important part of a telecommunications, such as an ADSL, deployment. In cases where the transceiver connection is not performing as expected, for example, where the data rate is low, where there are many bit errors, or the like, it is necessary to collect diagnostic and test information from the remote transceiver. This is performed by dispatching a technician to the remote site, e.g., a truck roll, which is time consuming and expensive.

In DSL technology, communications over a local subscriber loop between a central office and a subscriber premises is accomplished by modulating the data to be transmitted onto a multiplicity of discrete frequency carriers which are summed together and then transmitted over the subscriber loop. Individually, the carriers form discrete, non-overlapping communication subchannels of limited bandwidth. Collectively, the carriers form what is effectively a broadband communications channel. At the receiver end, the carriers are demodulated and the data recovered.

DSL systems experience disturbances from other data services on adjacent phone lines, such as, for example, ADSL, HDSL, ISDN, T1, or the like. These disturbances may commence after the subject ADSL service is already initiated and, since DSL for internet access is envisioned as an always-on service, the effect of these disturbances must be ameliorated by the subject ADSL transceiver.

SUMMARY OF THE INVENTION

The systems and methods of this invention are directed toward reliably exchanging diagnostic and test information between transceivers over a digital subscriber line in the presence of voice communications and/or other disturbances. For simplicity of reference, the systems and methods of the invention will hereafter refer to the transceivers generically as modems. One such modem is typically located at a customer premises such as a home or business and is "downstream" from a central office with which it communicates. The other modem is typically located at the central office and is "upstream" from the customer premises. Consistent with industry practice, the modems are often referred to as "ATU-R" ("ADSL transceiver unit, remote," i.e., located at the customer premises) and "ATU-C" ("ADSL transceiver unit, central office" i.e., located at the central office). Each modem includes a transmitter section for transmitting data and a receiver section for receiving data, and is of the discrete multitone type, i.e., the modem transmits data over a multiplicity of subchannels of limited bandwidth. Typically, the upstream or ATU-C modem transmits data to the downstream or ATU-R modem over a first set of subchannels, which are usually the higher-frequency subchannels, and receives data from the downstream or ATU-R modem over a second, usually smaller, set of subchannels, commonly the lower-frequency subchannels. By establishing a diagnostic link mode between the two modems, the systems and methods of this invention are able to exchange diagnostic and test information in a simple and robust manner.

In the diagnostic link mode, the diagnostic and test information is communicated using a signaling mechanism that has a very high immunity to noise and/or other disturbances and can therefore operate effectively even in the case where the modems could not actually establish an acceptable connection in their normal operational mode.

For example, if the ATU-C and/or ATU-R modem fail to complete an initialization sequence, and are thus unable to enter a normal steady state communications mode, where the diagnostic and test information would normally be exchanged, the modems according to the systems and methods of this invention enter a robust diagnostic link mode. Alternatively, the diagnostic link mode can be entered automatically or manually, for example, at the direction of a user. In the robust diagnostic link mode, the modems exchange the diagnostic and test information that is, for example, used by a technician to determine the cause of a failure without the technician having to physically visit, i.e., a truckroll to, the remote site to collect data.

The diagnostic and test information can include, for example, but is not limited to, signal to noise ratio information, equalizer information, programmable gain setting information, bit allocation information, transmitted and received power information, margin information, status and rate information, telephone line condition information, such as the length of the line, the number and location of bridged taps, a wire gauge, or the like, or any other known or later developed diagnostic or test information that may be appropriate for the particular communications environment. For example, the exchanged diagnostic and test information can be directed toward specific limitations of the modems, to information relating to the modem installation and deployment environment, or to other diagnostic and test information that can, for example, be determined as needed which may aid in evaluating the cause of a specific failure or problem. Alternatively, the diagnostic and test information can include the loop length and bridged tap length estimations as discussed in co-pending Attorney Docket No. 081513-000003, filed herewith and incorporated herein by reference in its entirety.

For example, an exemplary embodiment of the invention illustrates the use of the diagnostic link mode in the communication of diagnostic information from the remote terminal (RT) transceiver, e.g., ATU-R, to the central office (CO) transceiver, e.g., ATU-C. Transmission of information from the remote terminal to the central office is important since a typical ADSL service provider is located in the central office and would therefore benefit from the ability to determine problems at the remote terminal without a truckroll. However, it is to be appreciated, that the systems and the methods of this invention will work equally well in communications from the central office to the remote terminal.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
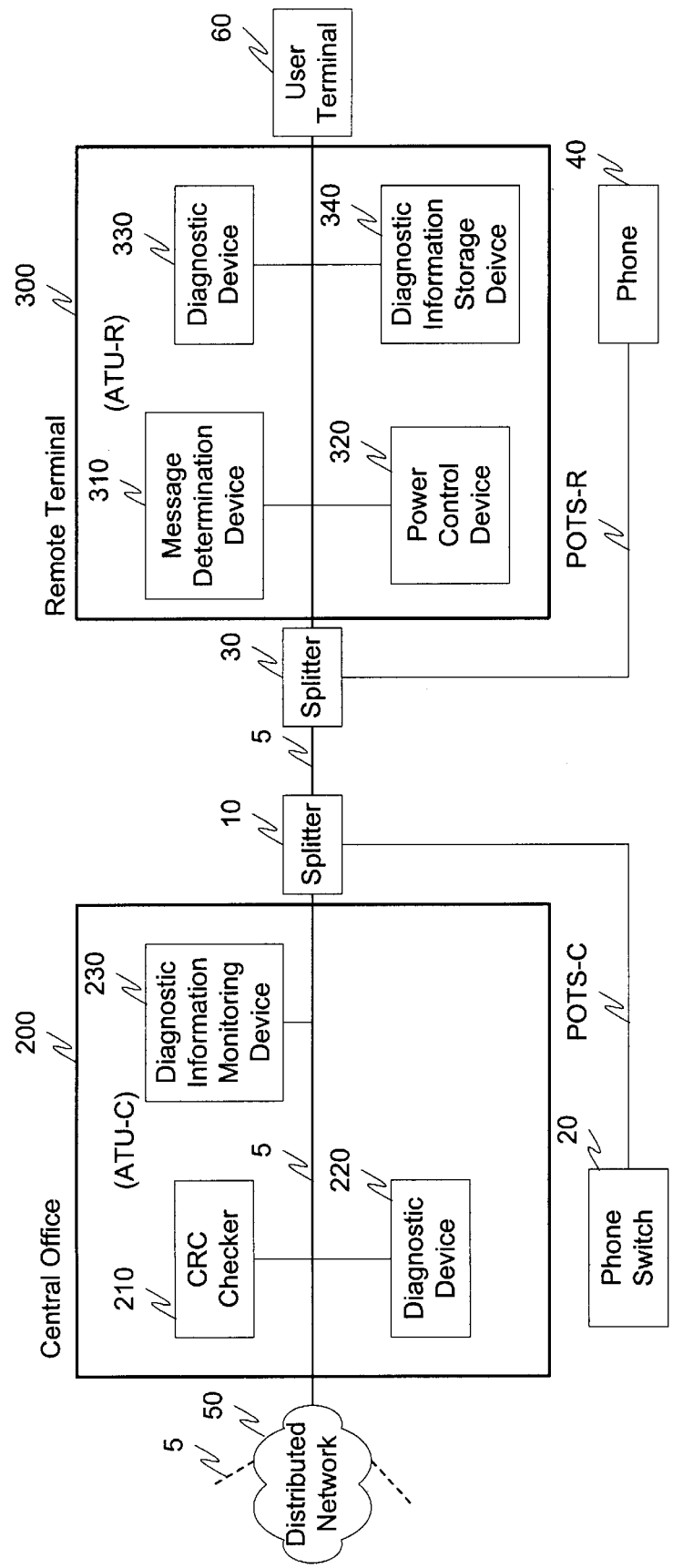
FIG. 1 is a functional block diagram illustrating an exemplary communications system according to this invention.

For ease of illustration the following description will be described in relation to the CO receiving diagnostic and test information from the RT. In the exemplary embodiment, the systems and methods of this invention complete a portion of the normal modem initialization before entering into the diagnostic link mode. The systems and methods of this invention can enter the diagnostic link mode manually, for example, at the direction of a technician or a user after completing a portion of initialization. Alternatively, the systems and methods of this invention can enter the diagnostic link mode automatically based on, for example, a bit rate failure, a forward error correction or a CRC error during showtime, e.g., the normal steady state transmission mode, or the like. The transition into the diagnostic link mode is accomplished by transmitting a message from the CO modem to the RT modem indicating that the modems are to enter into the diagnostic link mode, as opposed to transitioning into the normal steady state data transmission mode. Alternatively, the transition into the diagnostic link mode is accomplished by transmitting a message from the RT modem to the CO modem indicating that the modems are to enter into the diagnostic link mode as opposed to transitioning into the normal steady state data transmission mode. For example, the transition signal uses an ADSL state transition to transition from a standard ADSL state to a diagnostic link mode state.

In the diagnostic link mode, the RT modem sends diagnostic and test information in the form of a collection of information bits to the CO modem that are, for example, modulated by using one bit per DTM symbol modulation, as is used in the C-Rates1 message in the ITU and ANSI ADSL standards, where the symbol may or may not include a cyclic prefix. Other exemplary modulation techniques include Differential Phase Shift Keying (DPSK) on a subset or all the carriers, as specified in, for example, ITU standard G.994.1, higher order QAM modulation (>1 bit per carrier), or the like.

In the one bit per DMT symbol modulation message encoding scheme, a bit with value 0 is mapped to the REVERB1 signal and a bit with a value of 1 mapped to a SEGUE1 signal. The REVERB1 and SEGUE1 signals are defined in the ITU and ANSI ADSL standards. The REVERB1 signal is generated by modulating all of the carriers in the multicarrier system with a known pseudo-random sequence thus generating a wideband modulated signal. The SEGUE1 signal is generated from a carrier by 180 degree phase reversal of the REVERB 1 signal. Since both signals are wideband and known in advance, the receiver can easily detect the REVERB1 and SEGUE1 signal using a simple matched filter in the presence of large amounts of noise and other disturbances.

TABLE 1

Exemplary Message Variables

Data Sent in the Diag Link
Train Type
ADSL Standard
Chip Type
Vendor ID
Code Version
Average Reverb Received Signal
Programmable gain amplifier (PGA) Gain - Training
Programmable gain amplifier PGA Gain - Showtime
Filter Present during Idle Channel Calculation
Average Idle Channel Noise
Signal to Noise during Training
Signal to Noise during Showtime
Bits and Gains
Data Rate
Framing Mode
Margin
Reed-Solomon Coding Gain
QAM Usage
Frequency Domain Equalizer (FDQ) Coefficients
Gain Scale
Time domain equalizer (TDQ) Coefficients
Digital Echo Canceller (DEC) Coefficients Table 1 shows an example of a data message that can be sent by the RT to the CO during the diagnostic link mode. In this example, the RT modem sends 23 different data variables to the CO. Each data variable contains different items of diagnostic and test information that are used to analyze the condition of the link. The variables may contain more than one item of data. For example, the Average Reverb Signal contains the power levels per tone, up to, for example, 256 entries, detected during the ADSL Reverb signal. Conversely, the PGA Gain—Training is a single entry, denoting the gain in dB at the receiver during the ADSL training.

Many variables that represent the type of diagnostic and test information that are used to analyze the condition of the link are sent from the RT modem to the CO modem. These variables can be, for example, arrays with different lengths depending on, for example, information in the initiate diagnostic mode message. The systems and methods of this invention can be tailored to contain many different diagnostic and test information variables. Thus, the system is fully configurable, allowing subsets of data to be sent and additional data variables to be added in the future. Therefore, the message length can be increased or decreased, and diagnostic and test information customized, to support more or less variables as, for example, hardware, the environment and/or the telecommunications equipment dictates.

Therefore, it is to be appreciated, that in general the variables transmitted from the modem being tested to the receiving modem can be any combination of variables which allow for transmission of test and/or diagnostic information.

FIG. 1 illustrates an exemplary embodiment of the additional modem components associated with the diagnostic link mode. In particular, the diagnostic link system 100 comprises a central office modem 200 and a remote terminal modem 300. The central office modem 200 comprises, in addition to the standard ATU-C components, a CRC checker 210, a diagnostic device 220, and a diagnostic information monitoring device 230. The remote terminal modem 300 comprises, in addition to the standard components associated with an ATU-R, a message determination device 310, a power control device 320, a diagnostic device 330 and a diagnostic information storage device 340. The central office modem 200 and the remote terminal model 300 are also connected, via link 5, to a splitter 10 for a phone switch 20, and a splitter 30 for a phone 40. Alternatively, the ATU-R can operate without a splitter, e.g., splitterless, as specified in ITU standard G.992.2 (G.lite) or with an in-line filter in series with the phone 40. In addition, the remote terminal modem 300, can also be connected to, for example, one or more user terminals 60. Additionally, the central office modem 200 can be connected to one or more distributed networks 50, via link 5, which may or may not also be connected to one or more other distributed networks.

While the exemplary embodiment illustrated in FIG. 1 shows the diagnostic link system 100 for an embodiment in which the remote terminal modem 300 is communicating test and diagnostic information to the central office 200, it is to be appreciated that the various components of the diagnostic link system can be rearranged such that the diagnostic and test information can be forwarded from the central office 200 to the remote terminal modem 300, or, alternatively, such that both modems can send and receive diagnostic and/or test information. Furthermore, it is to be appreciated, that the components of the diagnostic link system 100 can be located at various locations within a distributed network, such as the—POTS network, or other comparable telecommunications network. Thus, it should be appreciated that the components of the diagnostic link system 100 can be combined into one device for respectively transmitting, receiving, or transmitting and receiving diagnostic and/or test information. As will be appreciated from the following description, and for reasons of computational efficiency, the components of the diagnostic link system 100 can be arranged at any location within a telecommunications network and/or modem without affecting the operation of the system.

The links 5 can be a wired or wireless link or any other known or later developed element(s) that is capable of supplying and communicating electronic data to and from the connected elements. Additionally, the user terminal 60 can be, for example, a personal computer or other device allowing a user to interface with and communicate over a modem, such as a DSL modem. Furthermore, the systems and method of this invention will work equally well with splitterless and low-pass mulitcarrier modem technologies.

In operation, the remote terminal 300, commences its normal initialization sequence. The diagnostic device 330 monitors the initialization sequence for a failure. If there is a failure, the diagnostic device 330 initiates the diagnostic link mode. Alternatively, a user or, for example, a technician at the CO, can specify that the remote terminal 300 enter into the diagnostic link mode after completing a portion of an initialization. Alternatively still, the diagnostic device 330 can monitor the normal steady state data transmission of the remote terminal, and upon, for example, an error threshold being exceeded, the diagnostic device 330 will initiate the diagnostic link mode.

Upon initialization of the diagnostic link mode, the diagnostic device 330, in cooperation with the remote terminal 300 will transmit an initiate diagnostic link mode message from the remote terminal to the central office 200 (RT to CO). Alternatively, the central office modem 200 can transmit an initiate diagnostic link mode message to the remote terminal modem 300. If the initiate diagnostic link mode message is received by the central office 200, the diagnostic device 330, in cooperation with the message determination device 310, determines a diagnostic link message to be forwarded to the central office 200. For example, the diagnostic link message can include test information that has been assembled during, for example, the normal ADSL initialization procedure. The diagnostic and/or test information can include, but is not limited to, the version number of the diagnostic link mode, the length of the diagnostic and/or test information, the communications standard, such as the ADSL standard, the chipset type, the vendor identifications, the ATU version number, the time domain received reverb signal, the frequency domain reverb signal, the amplifier settings, the CO transmitter power spectral density, the frequency domain received idle channel, the signal to noise ratio, the bits and gains and the upstream and downstream transmission rates, or the like.

If the initiate diagnostic link mode message is not received by the central office 200, the initiate diagnostic link mode message can, for example, be retransmitted a predetermined number of iterations until a determination is made that it is not possible to establish a connection.

Assuming the initiate diagnostic link mode message is received, then, for a predetermined number of iterations, the diagnostic device 330, in cooperation with the remote terminal modem 300 and the diagnostic information storage device 340, transmits the diagnostic link message with a cyclic redundancy check (CRC) to the central office modem 200. However, it is to be appreciated that in general, any error detection scheme, such as bit error detection, can be used without affecting the operation of the system. The central office 200, in cooperation with the CRC checker 210, determines if the CRC is correct. If the CRC is correct, the diagnostic information stored in the diagnostic information storage device 340 has been, with the cooperation of the diagnostic device 330, and the remote terminal modem 300, forwarded to the central office 200 successfully.

If, for example, the CRC checker 210 is unable to determine the correct CRC, the diagnostic device 330, in cooperation with power control device 320, increases the transmission power of the remote terminal 300 and repeats the transmission of the diagnostic link message from the remote terminal 300 to the central office 200. This process continues until the correct CRC is determined by the CRC checker 210.

The maximum power level used for transmission of the diagnostic link message can be specified by, for example, the user or the ADSL service operator. If the CRC checker 210 does not determine a correct CRC at the maximum power level and the diagnostic link mode can not be initiated then other methods for determining diagnostic information are utilized, such as dispatching a technician to the remote site, or the like.

Alternatively, the remote terminal 300, with or without an increase in the power level, can transmit the diagnostic link message several times, for example, 4 times. By transmitting the diagnostic link message several times, the CO modem 200 can use, for example, a diversity combining scheme to improve the probability of obtaining a correct CRC from the received diagnostic link message(s).

Alternatively, as previously discussed, the central office 200 comprises a diagnostic information monitoring device 230. The remote terminal 300 can also include a diagnostic information monitoring device. One or more of these diagnostic information monitoring devices can monitor the normal steady state data transmission between the remote terminal 300 and the central office 200. Upon, for example, the normal steady state data transmission exceeded a predetermined error threshold, the diagnostic information monitoring device can initiate the diagnostic link mode with the cooperation of the diagnostic device 300 and/or the diagnostic device 220.

Figure 2:
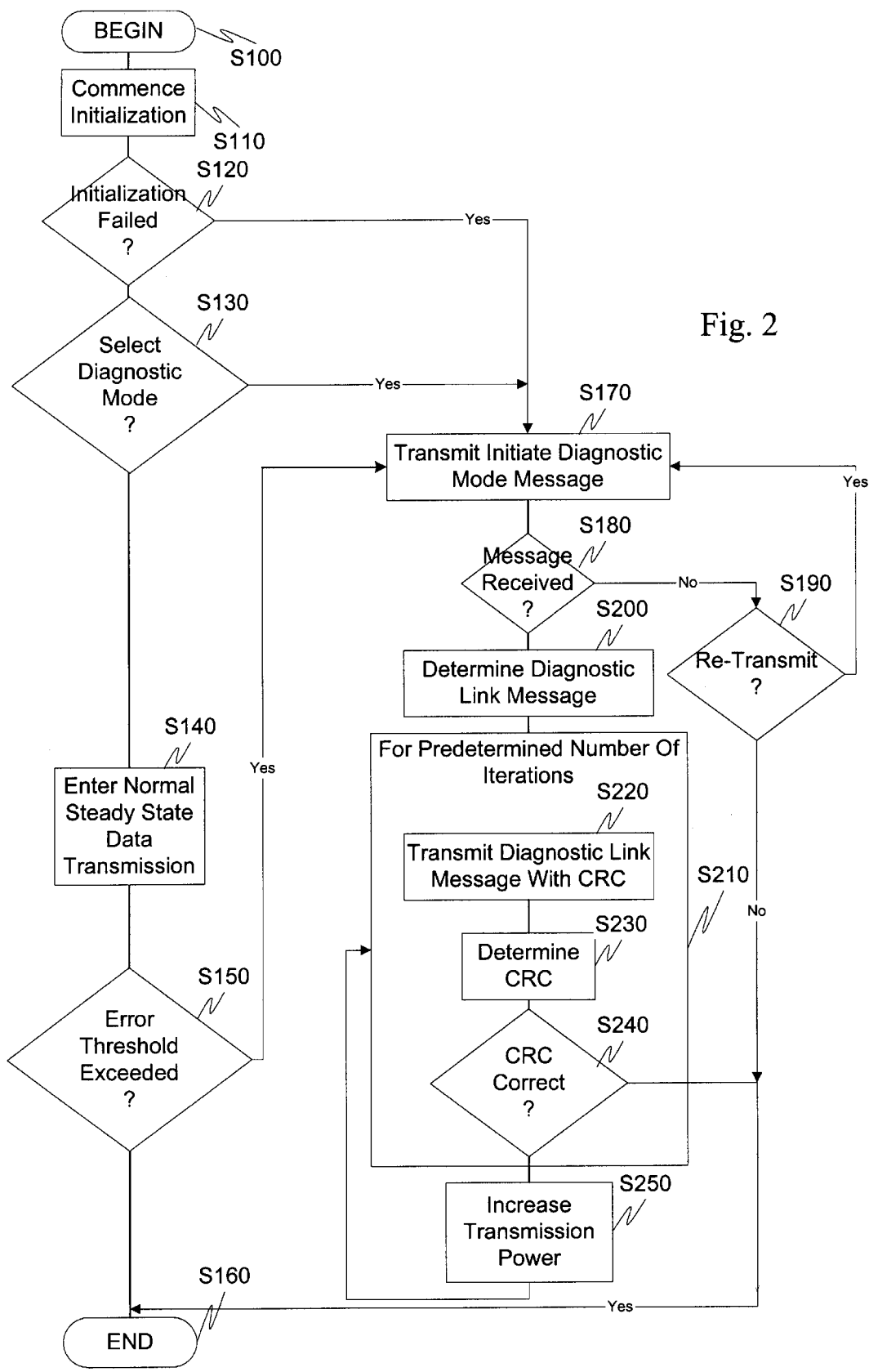
FIG. 2 is a flowchart outlining an exemplary method for communicating diagnostic and test information according to this invention.

FIG. 2 illustrates an exemplary method for entering a diagnostic link mode in accordance with this invention. In particular, control begins in step S100 and continues to step S110. In step S110, the initialization sequence is commenced. Next, in step S120, if an initialization failure is detected, control continues to step S170. Otherwise, control jumps to step S130. In step S130, a determination is made whether the diagnostic link mode has been selected. If the diagnostic link mode has been selected, control continues to step S170, otherwise, control jumps to step S140.

In step S170, the initiate diagnostic link mode message is transmitted from, for example, the remote terminal to the central office. Next, in step S180, a determination is made whether the initiate diagnostic mode message has been received by the CO. If the initiate diagnostic mode message has been received by the CO, control jumps to step S200. Otherwise, control continues to step S190. In step S190, a determination is made whether to re-transmit the initiate diagnostic mode message, for example, based on whether a predetermined number of iterations have already been completed. If the initiate diagnostic mode message is to be re-transmitted, control continues back to step S170. Otherwise, control jumps to step S160.

In step S200, the diagnostic link message is determined, for example, by assembling test and diagnostic information about one or more of the local loop, the modem itself, the telephone network at the remote terminal, or the like. Next, in step S210, for a predetermined number of iterations, steps S220–S240 are completed. In particular, in step S220 a diagnostic link message comprising a CRC is transmitted to, for example, the CO. Next, in step S230, the CRC is determined. Then, in step S240, a determination is made whether the CRC is correct. If the CRC is correct, the test and/or diagnostic information has been successfully communicated and control continues to step S160.

Otherwise, if step S210 has completed the predetermined number of iterations, control continues to step S250. In step S250, the transmission power is increased and control continues back to step S210. Alternatively, as previously discussed, the diagnostic link message may be transmitted a predetermined number of times, with our without a change in the transmission power.

In step S140, the normal steady state data transmission is entered into between two modems, such as the remote terminal and the cental office modems. Next, in step S150, a determination is made whether an error threshold during the normal steady state data transmission has been exceeded. If the error threshold has been exceeded, control continues to step S170. Otherwise, control jumps to step S160. In step S160, the control sequence ends.

As shown in FIG. 1, the diagnostic link mode system can be implemented either on a single program general purpose computer, a modem, such as a DSL modem, or a separate program general purpose computer having a communications device. However, the diagnostic link system can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like, and associated communications equipment. In general, any device capable of implementing a finite state machine that is capable of implementing the flowchart illustrated in FIG. 2 can be used to implement a diagnostic link system according to this invention.

Furthermore, the disclosed method may be readily implemented in software using object or object-oriented software development environments that provide portable source code that can be used on a variety of computer, workstation, or modem hardware platforms. Alternatively, the disclosed diagnostic link system may be implemented partially or fully in hardware using standard logic circuits or a VLSI design. Other software or hardware can be used to implement the systems in accordance with this invention depending on the speed and/or efficiency requirements of the systems, the particular function, and a particular software or hardware systems or microprocessor or microcomputer systems being utilized. The diagnostic link system and methods illustrated herein however, can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor, or the like. In these instances, the methods and systems of this invention can be implemented as a program embedded on a modem, such a DSL modem, as a resource residing on a personal computer, as a routine embedded in a dedicated diagnostic link system, a central office, or the like. The diagnostic link system can also be implemented by physically incorporating the system and method into a software and/or hardware system, such as a hardware and software systems of a modem, a general purpose computer, an ADSL line testing device, or the like.

It is, therefore, apparent that there is provided in accordance with the present invention, systems and methods for transmitting a diagnostic link message. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and the scope of this invention.

What is claimed is:

1. A method of communicating diagnostic information from a first transceiver to a second transceiver over a communication channel using multicarrier modulation comprising:

transmitting an initiate diagnostic mode message from the first transceiver to the second transceiver; and transmitting a diagnostic message using multicarrier modulation, wherein the diagnostic message comprises the diagnostic information about the communication channel and at least one bit in the diagnostic message is mapped to at least one REVERB signal.

2. The method of claim 1, wherein the diagnostic message is re-transmitted at least one time.

3. The method of claim 1, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

4. The method of claim 1, wherein the first transceiver is a central office modem or a remote terminal modem.

5. The method of claim 1, wherein the second transceiver is a central office modem or a remote terminal modem.

6. The method of claim 1, wherein the communications channel is at least one of a wired or wireless link.

7. In a multicarrier modulation transceiver, a method of communicating diagnostic information over a communication channel using multicarrier modulation comprising:

transmitting an initiate diagnostic mode message; and transmitting a diagnostic message using multicarrier modulation, wherein the diagnostic message comprises the diagnostic information about the communication channel and at least one bit in the diagnostic message is mapped to at least one REVERB signal.

8. The method of claim 7, wherein the diagnostic message is re-transmitted at least one time.

9. The method of claim 7, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

10. The method of claim 7, wherein the transceiver is a central office modem or a remote terminal modem.

11. The method of claim 7, wherein the communications channel is at least one of a wired or wireless link.

12. In a multicarrier modulation transceiver, a method of communicating diagnostic information over a communication channel using multicarrier modulation comprising:

receiving an initiate diagnostic mode message; and transmitting a diagnostic message using multicarrier modulation, wherein the diagnostic message comprises the diagnostic information about the communication channel and at least one bit in the diagnostic message is mapped to at least one REVERB signal.

13. The method of claim 12, wherein the diagnostic message is re-transmitted at least one time.

14. The method of claim 12, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

15. The method of claim 12, wherein the transceiver is a central office modem or a remote terminal modem.

16. The method of claim 12, wherein the communications channel is at least one of a wired or wireless link.

17. A method of communicating diagnostic information from a first transceiver to a second transceiver over a communication channel using multicarrier modulation comprising:

transmitting an initiate diagnostic mode message from the first transceiver to the second transceiver; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

18. The method of claim 17, wherein the diagnostic message is re-transmitted at least one time.

19. The method of claim 17, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

20. The method of claim 17, wherein the first transceiver is a central office modem or a remote terminal modem.

21. The method of claim 17, wherein the second transceiver is a central office modem or a remote terminal modem.

22. The method of claim 17, wherein the communications channel is at least one of a wired or wireless link.

23. In a multicarrier communication transceiver, a method of communicating diagnostic information over a communication channel using multicarrier modulation comprising:

transmitting an initiate diagnostic mode message; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

24. The method of claim 23, wherein the diagnostic message is re-transmitted at least one time.

25. The method of claim 23, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

26. The method of claim 23, wherein the transceiver is a central office modem or a remote terminal modem.

27. The method of claim 23, wherein the communications channel is at least one of a wired or wireless link.

28. In a multicarrier communication transceiver, a method of communicating diagnostic information over a communication channel using multicarrier modulation comprising:

receiving an initiate diagnostic mode message; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

29. The method of claim 28, wherein the diagnostic message is re-transmitted at least one time.

30. The method of claim 28, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

31. The method of claim 28, wherein the transceiver is a central office modem or a remote terminal modem.

32. The method of claim 28, wherein the communications channel is at least one of a wired or wireless link.

33. A method of communicating diagnostic information from a first transceiver to a second transceiver over a communication channel using multicarrier modulation comprising:

transmitting an initiate diagnostic mode message from the first transceiver to the second transceiver; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

34. The method of claim 33, wherein the diagnostic message is re-transmitted at least one time.

35. The method of claim 33, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

36. The method of claim 33, wherein the first transceiver is a central office modem or a remote terminal modem.

37. The method of claim 33, wherein the second transceiver is a central office modem or a remote terminal modem.

38. The method of claim 33, wherein the communications channel is at least one of a wired or wireless link.

39. In a multicarrier modulation transceiver, a method of communicating diagnostic information over a communication channel using multicarrier modulation comprising:

transmitting an initiate diagnostic mode message; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

40. The method of claim 39, wherein the diagnostic message is re-transmitted at least one time.

41. The method of claim 39, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

42. The method of claim 39, wherein the transceiver is a central office modem or a remote terminal modem.

43. The method of claim 39, wherein the communications channel is at least one of a wired or wireless link.

44. In a multicarrier modulation transceiver, a method of communicating diagnostic information over a communication channel using multicarrier modulation comprising:

receiving an initiate diagnostic mode message; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

45. The method of claim 44, wherein the diagnostic message is re-transmitted at least one time.

46. The method of claim 44, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

47. The method of claim 44, wherein the transceiver is a central office modem or a remote terminal modem.

48. The method of claim 44, wherein the communications channel is at least one of a wired or wireless link.

49. A diagnostic system that communicates diagnostic information over a communication channel using multicarrier modulation comprising:

a first transceiver that transmits an initiate diagnostic mode message to a second transceiver; and a message determination module that determines and, in cooperation with the first transceiver, transmits using multicarrier modulation a diagnostic message, wherein the diagnostic message comprises the diagnostic information about the communication channel and at least one bit in the diagnostic message is mapped to at least one REVERB signal.

50. The system of claim 49, wherein the diagnostic message is re-transmitted at least one time.

51. The system of claim 49, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

52. The system of claim 49, wherein the first transceiver is a central office modem or a remote terminal modem.

53. The system of claim 49, wherein the second transceiver is a central office modem or a remote terminal modem.

54. The system of claim 49, wherein the communications channel is at least one of a wired or wireless link.

55. A diagnostic system that communicates diagnostic information over a communication channel using multicarrier modulation comprising:

a transceiver that transmits an initiate diagnostic mode message; and a message determination module that determines and, in cooperation with the transceiver, transmits using multicarrier modulation a diagnostic message, wherein the diagnostic message comprises the diagnostic information about the communication channel and at least one bit in the diagnostic message is mapped to at least one REVERB signal.

56. The system of claim 55, wherein the diagnostic message is re-transmitted at least one time.

57. The system of claim 55, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

58. The system of claim 55, wherein the transceiver is a central office modem or a remote terminal modem.

59. The system of claim 55, wherein the communications channel is at least one of a wired or wireless link.

60. A diagnostic system that communicates diagnostic information over a communication channel using multicarrier modulation comprising:
  a transceiver that receives an initiate diagnostic mode message; and
  a message determination module that determines, and in cooperation with the transceiver, transmits using multicarrier modulation a diagnostic message, wherein the diagnostic message comprises the diagnostic information about the communication channel and at least one bit in the diagnostic message is mapped to at least one REVERB signal.

61. The system of claim 60, wherein the diagnostic message is re-transmitted at least one time.

62. The method of claim 60, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

63. The system of claim 60, wherein the transceiver is a central office modem or a remote terminal modem.

64. The system of claim 60, wherein the communications channel is at least one of a wired or wireless link.

65. A diagnostic system that communicates diagnostic information over a communication channel using multicarrier modulation comprising:
  a first transceiver that completes a portion of initialization and transmits an initiate diagnostic mode message to a second transceiver; and
  a message determination module that determines and, in cooperation with the first transceiver, transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

66. The system of claim 65, wherein the diagnostic message is re-transmitted at least one time.

67. The system of claim 65, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

68. The system of claim 65, wherein the first transceiver is a central office modem or a remote terminal modem.

69. The system of claim 65, wherein the second transceiver is a central office modem or a remote terminal modem.

70. The system of claim 65, wherein the communications channel is at least one of a wired or wireless link.

71. A diagnostic system that communicates diagnostic information over a communication channel using multicarrier modulation comprising:
  a transceiver that transmits an initiate diagnostic mode message; and
  a message determination module that determines, and in cooperation with the transceiver, transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

72. The system of claim 71, wherein the diagnostic message is re-transmitted at least one time.

73. The system of claim 71, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

74. The system of claim 71, wherein the transceiver is a central office modem or a remote terminal modem.

75. The system of claim 71, wherein the communications channel is at least one of a wired or wireless link.

76. In a multicarrier communication transceiver, a method of communicating diagnostic information over a communication channel using multicarrier modulation comprising:
  a transceiver that receives an initiate diagnostic mode message; and
  a message determination module that determines, and in cooperation with the transceiver, transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

77. The system of claim 76, wherein the diagnostic message is re-transmitted at least one time.

78. The system of claim 76, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

79. The system of claim 76, wherein the transceiver is a central office modem or a remote terminal modem.

80. The system of claim 76, wherein the communications channel is at least one of a wired or wireless link.

81. A diagnostic system that communicates diagnostic information over a communication channel using multicarrier modulation comprising:
  a first transceiver that transmits an initiate diagnostic mode message to a second transceiver; and
  a message determination module that determines and, in cooperation with the first transceiver, transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

82. The system of claim 81, wherein the diagnostic message is re-transmitted at least one time.

83. The system of claim 81, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

84. The system of claim 81, wherein the first transceiver is a central office modem or a remote terminal modem.

85. The system of claim 81, wherein the second transceiver is a central office modem or a remote terminal modem.

86. The system of claim 81, wherein the communications channel is at least one of a wired or wireless link.

87. A diagnostic system that communicates diagnostic information over a communication channel using multicarrier modulation comprising:
  a transceiver that transmits an initiate diagnostic mode message; and
  a message determination module that determines and, in cooperation with the transceiver, transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the transceiver transmits the initiate diagnostic mode message in the event steady state communications can not be established due to the communication channel conditions.

88. The system of claim 81, wherein the diagnostic message is re-transmitted at least one time.

89. The system of claim 87, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

90. The system of claim 87, wherein the transceiver is a central office modem or a remote terminal modem.

91. The system of claim 87, wherein the communications channel is at least one of a wired or wireless link.

92. A diagnostic system that communicates diagnostic information over a communication channel using multicarrier modulation comprising:
  a transceiver that receives an initiate diagnostic mode message; and
  a message determination module that determines and, in cooperation with the transceiver, transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the transceiver transmits the initiate diagnostic mode message in the event steady state communications can not be established due to the communication channel conditions.

93. The system of claim 92, wherein the diagnostic message is re-transmitted at least one time.

94. The system of claim 92, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

95. The system of claim 92, wherein the transceiver is a central office modem or a remote terminal modem.

96. The method of claim 92, wherein the communications channel is at least one of a wired or wireless link.

97. A system that communicates diagnostic channel information from a first transceiver to a second transceiver over a communication channel using multicarrier modulation comprising:
  means for transmitting an initiate diagnostic mode message from the first transceiver to the second transceiver; and
  means for transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

98. The system of claim 97, wherein the diagnostic message is re-transmitted at least one time.

99. The system of claim 97, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

100. The system of claim 97, wherein the first transceiver is a central office modem or a remote terminal modem.

101. The system of claim 97, wherein the second transceiver is a central office modem or a remote terminal modem.

102. The system of claim 97, wherein the communications channel is at least one of a wired or wireless link.

103. In a multicarrier communication transceiver, a system that communicates diagnostic information over a communication channel using multicarrier modulation comprising:

transmitting an initiate diagnostic mode message; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

104. The system of claim 103, wherein the diagnostic message is re-transmitted at least one time.

105. The system of claim 103, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

106. The system of claim 103, wherein the transceiver is a central office modem or a remote terminal modem.

107. The system of claim 103, wherein the communications channel is at least one of a wired or wireless link.

108. In a multicarrier communication transceiver, a system that communicates diagnostic information over a communication channel using multicarrier modulation comprising:

means for receiving an initiate diagnostic mode message; and means for transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

109. The system of claim 108, wherein the diagnostic message is re-transmitted at least one time.

110. The system of claim 108, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

111. The system of claim 108, wherein the transceiver is a central office modem or a remote terminal modem.

112. The system of claim 108, wherein the communications channel is at least one of a wired or wireless link.

113. A system that communicates diagnostic information from a first transceiver to a second transceiver over a communication channel using multicarrier modulation comprising:

means for transmitting an initiate diagnostic mode message from the first transceiver to the second transceiver; and means for transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

114. The system of claim 113, wherein the diagnostic message is re-transmitted at least one time.

115. The system of claim 113, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

116. The system of claim 113, wherein the first transceiver is a central office modem or a remote terminal modem.

117. The system of claim 113, wherein the second transceiver is a central office modem or a remote terminal modem.

118. The system of claim 113, wherein the communications channel is at least one of a wired or wireless link.

119. In a multicarrier modulation transceiver, a system that communicates diagnostic information over a communication channel using multicarrier modulation comprising:

means for transmitting an initiate diagnostic mode message; and means for transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

120. The system of claim 119, wherein the diagnostic message is re-transmitted at least one time.

121. The system of claim 119, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

122. The system of claim 119, wherein the transceiver is a central office modem or a remote terminal modem.

123. The system of claim 119, wherein the communications channel is at least one of a wired or wireless link.

124. In a multicarrier modulation transceiver, a system for communicating diagnostic information over a communication channel using multicarrier modulation comprising:

means for receiving an initiate diagnostic mode message; and means for transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

125. The system of claim 124, wherein the diagnostic message is re-transmitted at least one time.

126. The system of claim 124, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

127. The system of claim 124, wherein the transceiver is a central office modem or a remote terminal modem.

128. The system of claim 124, wherein the communications channel is at least one of a wired or wireless link.

129. A protocol for communicating diagnostic information from a first transceiver to a second transceiver over a communication channel using multicarrier modulation comprising:

transmitting an initiate diagnostic mode message from the first transceiver to the second transceiver; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

130. The protocol of claim 129, wherein the diagnostic message is re-transmitted at least one time.

131. The protocol of claim 129, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

132. The protocol of claim 129, wherein the first transceiver is a central office modem or a remote terminal modem.

133. The protocol of claim 129, wherein the second transceiver is a central office modem or a remote terminal modem.

134. The protocol of claim 129, wherein the communications channel is at least one a wired or wireless link.

135. In a multicarrier communication transceiver, a protocol for communicating diagnostic information over a communication channel using multicarrier modulation comprising:

transmitting an initiate diagnostic mode message; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

136. The protocol of claim 135, wherein the diagnostic message is re-transmitted at least one time.

137. The protocol of claim 135, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

138. The protocol of claim 135, wherein the transceiver is a central office modem or a remote terminal modem.

139. The protocol of claim 135, wherein the communications channel is at least one of a wired or wireless link.

140. In a multicarrier communication transceiver, a protocol for communicating diagnostic information over a communication channel using multicarrier modulation comprising:

receiving an initiate diagnostic mode message; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

141. The protocol of claim 140, wherein the diagnostic message is re-transmitted at least one time.

142. The protocol of claim 140, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

143. The protocol of claim 140, wherein the transceiver is a central office modem or a remote terminal modem.

144. The protocol of claim 140, wherein the communications channel is at least one of a wired or wireless link.

145. A protocol for communicating diagnostic information from a first transceiver to a second transceiver over a communication channel using multicarrier modulation comprising:

transmitting an initiate diagnostic mode message from the first transceiver to the second transceiver; and transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

146. The protocol of claim 145, wherein the diagnostic message is re-transmitted at least one time.

147. The protocol of claim 145, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

148. The protocol of claim 145, wherein the first transceiver is a central office modem or a remote terminal modem.

149. The protocol of claim 145, wherein the second transceiver is a central office modem or a remote terminal modem.

150. The protocol of claim 145, wherein the communications channel is at least one of a wired or wireless link.

151. In a multicarrier modulation transceiver, a protocol for communicating diagnostic information over a communication channel using multicarrier modulation comprising:
transmitting an initiate diagnostic mode message; and
transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

152. The protocol of claim 151, wherein the diagnostic message is re-transmitted at least one time.

153. The protocol of claim 151, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

154. The protocol of claim 151, wherein the transceiver is a central office modem or a remote terminal modem.

155. The protocol of claim 151, wherein the communications channel is at least one of a wired or wireless link.

156. In a multicarrier modulation transceiver, a protocol for communicating diagnostic information over a communication channel using multicarrier modulation comprising:
receiving an initiate diagnostic mode message; and
transmitting a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

157. The protocol of claim 156, wherein the diagnostic message is re-transmitted at least one time.

158. The protocol of claim 156, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

159. The protocol of claim 156, wherein the transceiver is a central office modem or a remote terminal modem.

160. The protocol of claim 156, wherein the communications channel is at least one of a wired or wireless link.

161. An information storage media comprising information that communicates diagnostic information from a first transceiver to a second transceiver over a communication channel using multicarrier modulation comprising:
information that transmits an initiate diagnostic mode message from the first transceiver to the second transceiver; and
information that transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

162. The media of claim 161, wherein the diagnostic message is re-transmitted at least one time.

163. The media of claim 161, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

164. The media of claim 161, wherein the first transceiver is a central office modem or a remote terminal modem.

165. The media of claim 161, wherein the second transceiver is a central office modem or a remote terminal modem.

166. The media of claim 161, wherein the communications channel is at least one of a wired or wireless link.

167. An information storage media comprising information that communicates diagnostic information over a communication channel using multicarrier modulation comprising:
information that transmits an initiate diagnostic mode message; and
information that transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

168. The media of claim 167, wherein the diagnostic message is re-transmitted at least one time.

169. The media of claim 167, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

170. The media of claim 167, wherein the transceiver is a central office modem or a remote terminal modem.

171. The media of claim 167, wherein the communications channel is at least one of a wired or wireless link.

172. An information storage media comprising information that communicates diagnostic information over a communication channel using multicarrier modulation comprising:
  information that receives an initiate diagnostic mode message; and
  information that transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates.

173. The media of claim 172, wherein the diagnostic message is re-transmitted at least one time.

174. The media of claim 172, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

175. The media of claim 172, wherein the transceiver is a central office modem or a remote terminal modem.

176. The media of claim 172, wherein the communications channel is at least one of a wired or wireless link.

177. An information storage media comprising information a communicates diagnostic information from a first transceiver to a second transceiver over a communication channel using multicarrier modulation comprising:
  information that transmits an initiate diagnostic mode message from the first transceiver to the second transceiver; and
  information that transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

178. The media of claim 177, wherein the diagnostic message is re-transmitted at least one time.

179. The media of claim 177, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

180. The media of claim 177, wherein the first transceiver is a central office modem or a remote terminal modem.

181. The media of claim 177, wherein the second transceiver is a central office modem or a remote terminal modem.

182. The media of claim 177, wherein the communications channel is at least one of a wired or wireless link.

183. An information storage media comprising information that communicates diagnostic information over a communication channel using multicarrier modulation comprising:
  information that transmits an initiate diagnostic mode message; and
  information that transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

184. The media of claim 183, wherein the diagnostic message is re-transmitted at least one time.

185. The media of claim 183, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

186. The media of claim 183, wherein the transceiver is a central office modem or a remote terminal modem.

187. The media of claim 183, wherein the communications channel is at least one of a wired or wireless link.

188. An information storage media comprising information that communicates diagnostic information over a communication channel using multicarrier modulation comprising:
  information that receives an initiate diagnostic mode message; and
  information that transmits a diagnostic message using a modulation scheme that comprises mapping at least one bit in the diagnostic message to at least one REVERB signal, wherein the diagnostic message comprises diagnostic information about the communication channel including at least one of a length of the diagnostic information, a time domain received reverb signal, a frequency domain reverb signal, an amplifier setting, a CO transmitter power spectral density, a frequency domain received idle channel, a signal to noise ratio, bits and gain information, and upstream and downstream transmission rates and wherein the first transceiver transmits the initiate diagnostic mode message in the event steady state communications can not be established due to the communication channel conditions.

189. The media of claim 188, wherein the diagnostic message is re-transmitted at least one time.

190. The media of claim 188, wherein transmitting the initiate diagnostic mode message is based on at least one of an initialization failure, a bit rate failure, a CRC error in an initialization message, a CRC error during the normal steady state transmission mode, a forward error correction error, a user request and a CO technician request.

191. The media of claim 188, wherein the transceiver is a central office modem or a remote terminal modem.

192. The media of claim 188, wherein the communications channel is at least one of a wired or wireless link.

* * * * *